US006957239B2

(12) United States Patent
Conway et al.

(10) Patent No.: US 6,957,239 B2
(45) Date of Patent: Oct. 18, 2005

(54) SYSTEM AND METHOD FOR GENERATING WAVEFORMS USING WAVEFORM SEGMENT QUEUES

(75) Inventors: Craig M. Conway, Leander, TX (US); Brian Keith Odom, Georgetown, TX (US)

(73) Assignee: National Instruments Corporation, Austin, TX (US)

( * ) Notice: Subject to any disclaimer, the term of this patent is extended or adjusted under 35 U.S.C. 154(b) by 631 days.

(21) Appl. No.: 09/998,759

(22) Filed: Nov. 30, 2001

(65) Prior Publication Data

US 2003/0105609 A1    Jun. 5, 2003

(51) Int. Cl.[7] .............................................. G06F 1/02
(52) U.S. Cl. ................................................... 708/272
(58) Field of Search ............................... 708/270, 271, 708/272

(56) References Cited

U.S. PATENT DOCUMENTS

| | | | |
|---|---|---|---|
| 4,635,096 A | * | 1/1987 | Morgan ....................... 348/181 |
| 4,881,190 A | * | 11/1989 | Priatko et al. ............... 708/272 |
| 5,029,120 A | * | 7/1991 | Brodeur et al. .............. 708/272 |
| 5,528,356 A | | 6/1996 | Harcourt |
| 5,657,486 A | | 8/1997 | Czamara et al. |
| 6,393,449 B1 | * | 5/2002 | Bair et al. ................... 708/270 |

* cited by examiner

Primary Examiner—Chuong D Ngo
(74) Attorney, Agent, or Firm—Meyertons Hood Kivlin Kowert & Goetzel, P.C.; Jeffrey C. Hood

(57) ABSTRACT

A system for generating waveforms may include a memory configured to store a plurality of waveform segments, a plurality of waveform segment queues each coupled to receive waveform segments output by the memory, and a selection unit coupled to each of the waveform segment queues and configured to read waveform segments out of a selected one of the waveform segment queues. Each of the waveform segment queues may be configured to store a series of one or more waveform segments. The selection unit may be configured to access the first waveform segment queue during a first time period and to access the second waveform segment queue if a first trigger occurs.

44 Claims, 11 Drawing Sheets

Waveform Segments

Looping

Linking

Branching

```
(1) generate A
(2) generate B
(3) if Trigger1
        generate C
    end if
(4) generate D
(5) generate E
(6) if Trigger2
        loop 2X
            generate C
        end loop
    end if
(7) generate A
(8) if Trigger3
        generate E
    end if
(9) generate E
(10) halt
```

SYSTEM AND METHOD FOR GENERATING WAVEFORMS USING WAVEFORM SEGMENT QUEUES

FIELD OF THE INVENTION

The present invention relates to the field of instrumentation and data acquisition systems and, more particularly, to the field of waveform generation.

DESCRIPTION OF THE RELATED ART

An instrument may be defined as a device that collects data or information from an environment or unit under test (UUT) and displays this information to a user. An instrument may also analyze and process acquired data prior to displaying the data to the user. Alternatively (or additionally), an instrument may provide test stimuli to a UUT. Examples of instruments include oscilloscopes, digital multimeters, pressure sensors, arbitrary waveform generators, digital waveform generators, etc., and the type of information which may be collected by respective instruments includes voltage, resistance, distance, velocity, pressure, frequency of oscillation, humidity, or temperature, among others.

Scientists and engineers often use instrumentation or DAQ (data acquisition) systems to perform a variety of functions, including test and measurement, laboratory research, process monitoring and control, data logging, analytical chemistry, test and analysis of physical phenomena, and control of mechanical or electrical machinery, to name a few examples.

In the past, many instrumentation systems included individual instruments that were physically interconnected with each other. Each instrument typically included a physical front panel with its own particular combination of indicators, knobs, or switches. In order to be able to use such an instrumentation system, a user had to understand and manipulate individual controls for each instrument and record readings from an array of indicators. As a result, acquisition and analysis of data in such instrumentation systems tended to be tedious and error prone.

With the introduction of computers, it has become possible to provide more flexible means for interfacing instruments with a user. In computerized instrumentation systems, the user may interact with an instrumentation system through a host computer system instead of a manually operated front panel. Software executing on the computer system may be used to simulate the operation of various instruments in software or to control or communicate with one or more real world instruments. In either case, the software created/controlled instruments may be referred to as virtual instruments.

Computer-based instrumentation systems typically include transducers for transducing a physical phenomenon into an electrical signal, signal conditioning logic to perform amplification, isolation, and/or filtering, and analog-to-digital (A/D) conversion logic for receiving analog signals and providing corresponding digital signals to the host computer system.

In a computer-based system, the instrumentation hardware or device is typically an expansion card plugged into one of the I/O slots of the computer system. In another common instrumentation system configuration, the instrumentation hardware is coupled to the computer system via other means such as through a VXI (VME eXtensions for Instrumentation) bus, a GPIB (General Purpose Interface Bus), a serial port or bus, or parallel port of the computer system. The instrumentation hardware may be a DAQ card, a computer-based instrument such as a multimeter, or another type of instrumentation device.

The instrumentation device enables the computerized measurement and generation of real world analog and digital signals. The instrumentation device, e.g., a DAQ device, a multimeter device, etc., typically includes one or more analog to digital (A/D) converters (ADCs), digital to analog (D/A) converters (DACs), digital I/O ports, and counter/timer circuits.

The instrumentation hardware may be configured and controlled by software executing on the computer system. The software for configuring and controlling the instrumentation system typically includes driver software and the instrumentation application software, or the application. The driver software serves to interface the instrumentation hardware to the application and is typically supplied by the manufacturer of the instrumentation hardware or by a third party software vendor. The application is typically developed by the user of the instrumentation system and is tailored to the particular function that the user intends the instrumentation system to perform. The instrumentation hardware manufacturer or third party software vendor sometimes supplies application software for applications that are common, generic or straightforward.

Instrumentation driver software provides a high-level interface to the operations of the instrumentation device. The instrumentation driver software may operate to configure the instrumentation device for communication with the host system and to initialize hardware and software to a known state. The instrumentation driver software also generally maintains a soft copy of the state of the instrument and initiated operations. Further, the instrumentation driver software communicates over the bus to move the device from state to state and to respond to device requests.

As noted above, common instrumentation applications include arbitrary waveform generators (AWG) and digital waveform generators. An AWG or digital waveform generator may generate a waveform to stimulate a unit or process under test. Examples of waveforms that may be generated include sine waves, square waves, triangle waves, etc. In some applications, an AWG or digital waveform generator may be configured to generate a waveform that includes different component waveforms over time. It may be desirable for the AWG or digital waveform generator to be able to switch between which component waveform it is generating at any given time in response to a trigger condition. It may also be desirable to be able to provide several output waveforms from a single instrumentation device.

SUMMARY OF THE INVENTION

Various embodiments of a system and method for generating one or more waveforms from digital waveform samples using waveform segment queues are disclosed.

In one embodiment, a system for generating waveforms may include a memory, a plurality of waveform segment queues each coupled to receive waveform segments output by the memory, and a selection unit coupled to each of the waveform segment queues and configured to read waveform segments out of a selected one of the waveform segment queues. The selection unit may be configured to access the first waveform segment queue during a first time period and to access the second waveform segment queue if a first trigger occurs.

The memory may be configured to store a plurality of waveform segments (each of which may comprise a plurality of waveform samples). In response to receiving a request for one of the waveform segments, the memory may be configured to output the requested waveform segment. Each of the waveform segment queues may be configured to store a series of one or more waveform segments as they are output from the memory.

The system may also include a plurality of control units that are each configured to parse a series of instructions and each coupled to request waveform segments that are identified in the parsed instructions from the memory. For example, a first control unit may be configured to request a first waveform segment from the memory in response to parsing a first instruction to output the first waveform segment. When the memory outputs the first waveform segment, a first waveform segment queue may receive and store that waveform segment.

One embodiment of a method of generating a waveform may include retrieving a first waveform segment from a memory, storing the first waveform segment in a first queue, retrieving a second waveform segment from the memory, storing the second waveform segment in a second queue, reading the first waveform segment from the first queue, and if a first trigger occurs, reading the second waveform segment from the second queue. The waveform segments may be retrieved from the memory in response to receiving instructions that identify the waveform segments.

In another embodiment, a system that is configured to generate one or more waveform output streams includes a memory configured to store a plurality of waveform segments, a plurality of queues that are each coupled to receive waveform segments from the memory and each configured to store a series of waveform segments for a respective one of the waveform output streams, and one or more output interfaces. Each output interface may be coupled to read waveform segments from at least one of the waveform segment queues that stores waveform segments for a respective waveform data stream.

BRIEF DESCRIPTION OF THE DRAWINGS

A better understanding of the present invention can be obtained when the following detailed description of the preferred embodiment is considered in conjunction with the following drawings, in which.

Figure 1:
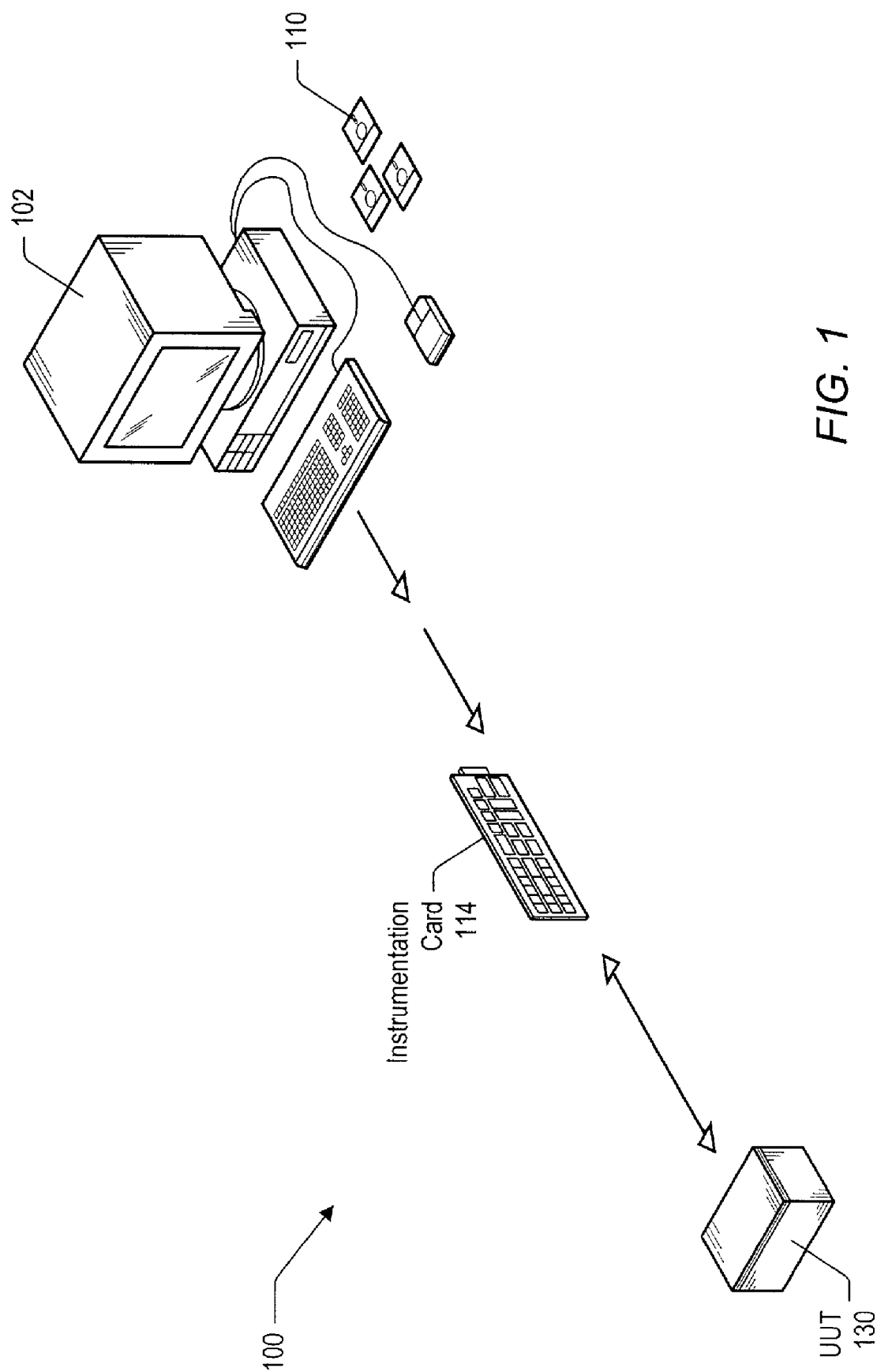
FIG. 1 illustrates one embodiment of a computer-based instrumentation system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly connected."

DETAILED DESCRIPTION OF THE EMBODIMENTS

Figure 2:
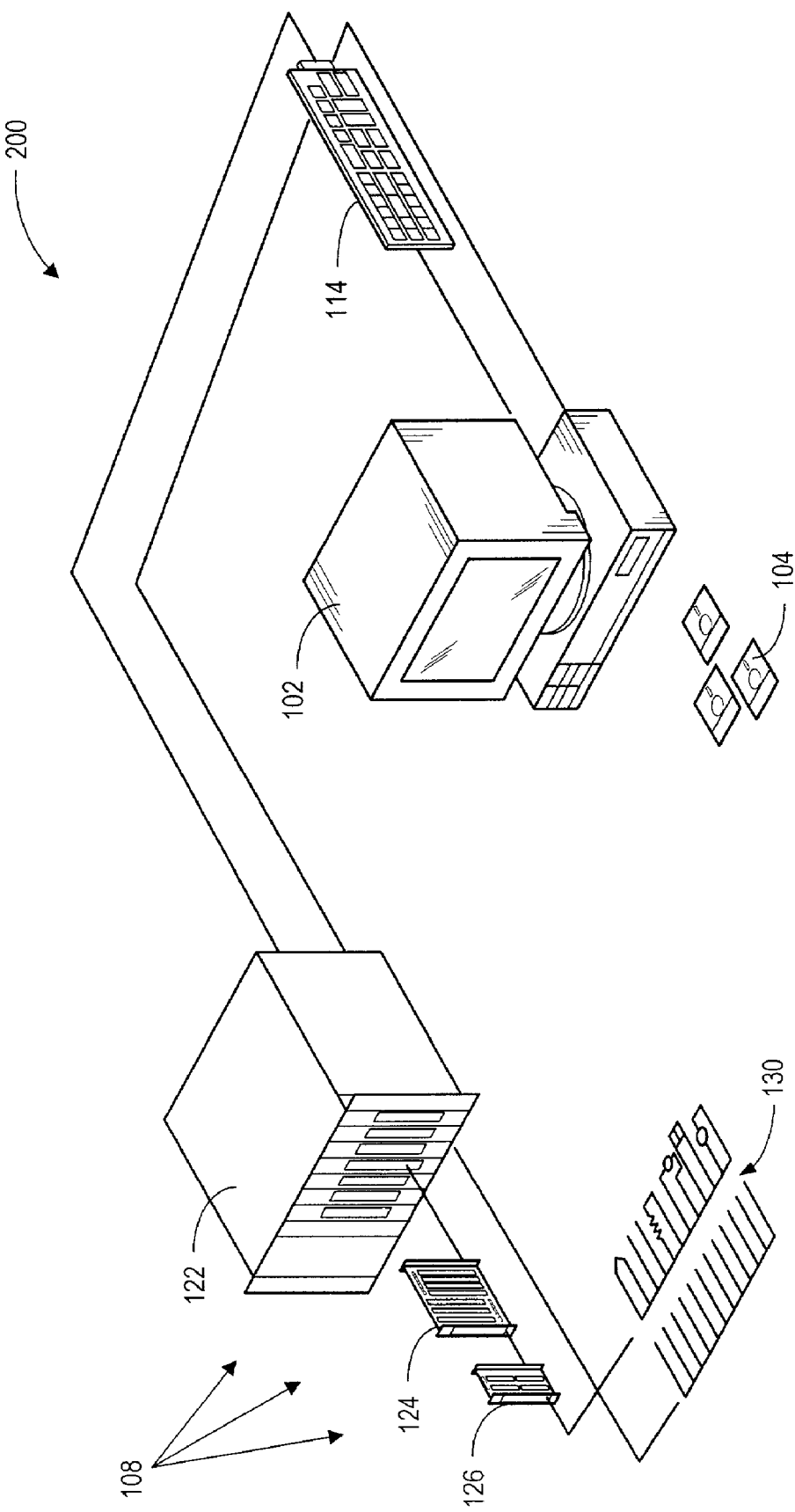
FIG. 2 shows another embodiment of an instrumentation system.

FIGS. 1 and 2—Instrumentation Systems

FIG. 1 illustrates one embodiment of an instrumentation control system 100. The system 100 may include a computer 102, which is connected to one or more instrumentation cards 114. The computer system 102 may include various standard elements, including at least one central processing unit (CPU), memory, a hard drive, one or more buses, a power supply, a display screen, and one or more input devices such as a mouse or keyboard. The host computer 102 also preferably includes a non-volatile media, such as a magnetic media, e.g., a hard drive, or optical storage, as well as system memory, such as DRAM, SRAM, etc. For illustration purposes, the instrumentation card 114 is shown outside the computer 102. However, the instrumentation card 114 maybe located within the chassis of the computer 102 in some embodiments. Alternatively, the instrumentation card 114 may be a device external to the computer 102 that is coupled to the unit under test (UUT) or process under test and to the computer 102. The computer 102 may connect through the one or more instrumentation cards 114 to analyze, measure, or control the unit under test (UUT) or process under test 130.

The instrumentation card(s) 114 may be coupled to the computer 102 by one or more I/O slots (not shown) provided by the computer 102. The instrumentation card(s) 114 may couple through one or more sensors or transducers (also not shown) to the UUT 130.

The system 100 may be used in a data acquisition and control application, in a test and measurement application, a process control application, or a man-machine interface application.

FIG. 2 shows another illustrative instrumentation system 200. The instrumentation system 200 may include a computer system 102, an instrumentation card 114, and a signal conditioning system 108. As in FIG. 1, the instrumentation card 114 may be an external device coupled to the computer system through an external interface or, alternatively, an internal device coupled to the computer system through an I/O slot. The I/O slot in the computer 102 may be a PCI bus slot, a PC Card slot, or an ISA, EISA or MicroChannel bus slot. The instrumentation card 114 may be coupled to a UUT 130 through the signal conditioning system 108 and one or more sensors or transducers.

The signal conditioning system 108 may include a signal conditioning chassis, e.g., an SCXI (Signal Conditioning eXtensions for Instrumentation) chassis 122, an SCXI module 124 and one or more SCXI terminal blocks 126. The SCXI chassis 122 may have one or more SCXI modules 124.

Figure 3:
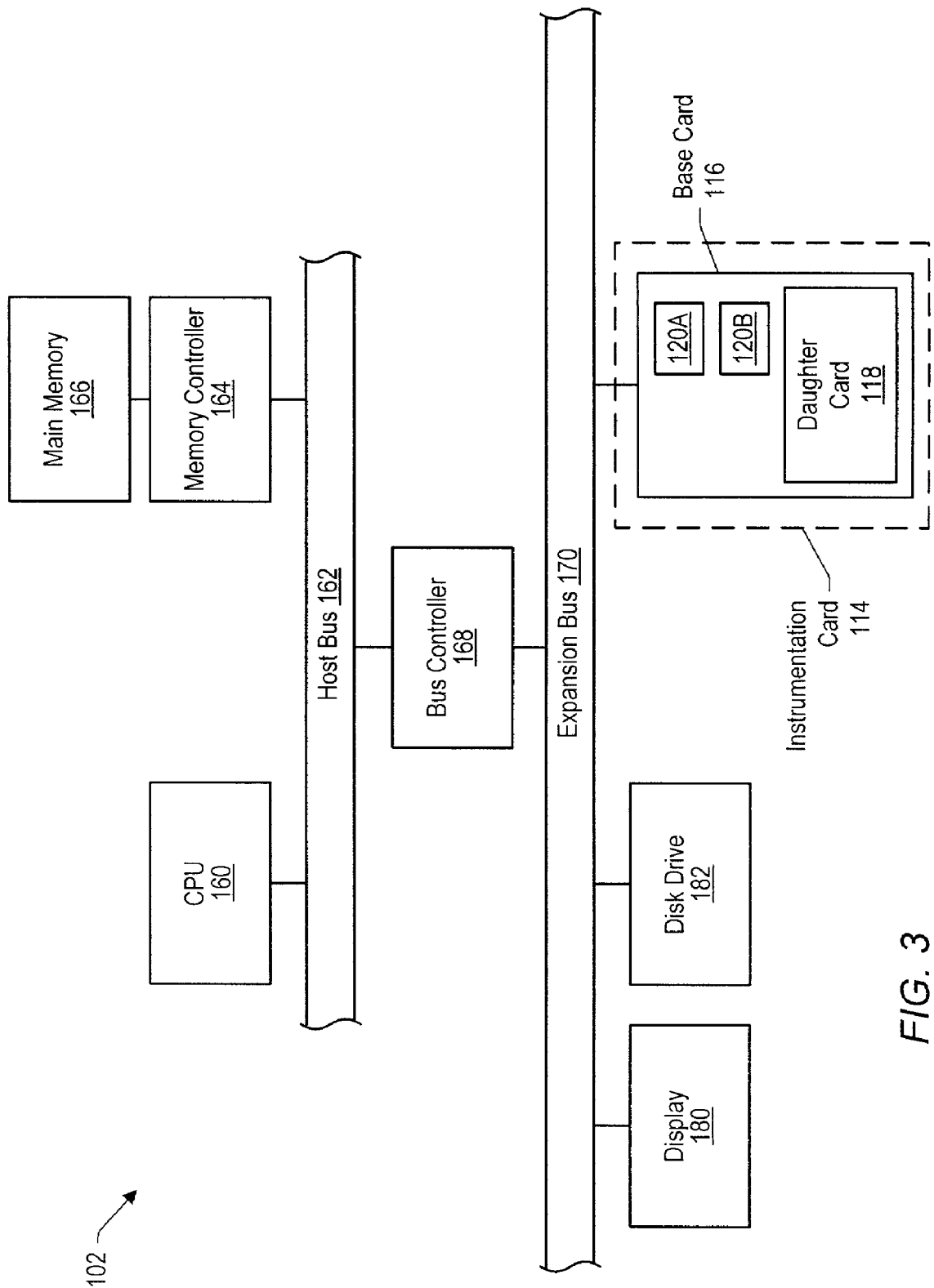
FIG. 3 is a block diagram of one embodiment of a computer system.

FIG. 3—Computer System

FIG. 3 shows a block diagram of one embodiment of the computer system 102 illustrated in FIGS. 1 and 2. It is noted that any type of computer configuration or architecture may be used, and FIG. 3 illustrates a representative PC embodiment. It is also noted that the computer system may be a general purpose computer as shown in FIGS. 1 and 2, a computer implemented on a VXI card installed in a VXI chassis, a computer implemented on a PXI card installed in a PXI chassis, etc. For simplicity, the elements of a computer not necessary to understand the operation of the present invention have been omitted.

In the illustrated embodiment, the computer 102 includes at least one central processing unit (CPU) 160, which is coupled to a processor or host bus 162. The CPU 160 may be any of various types (e.g., a Pentium class, a PowerPC processor, a CPU from the SPARC family of RISC processors, etc.). Main memory 166 is coupled to the host bus 162 by means of memory controller 164.

The main memory 166 may store a component development system and software components or objects and associated software. The main memory 166 may also store instrumentation software and various other software, such as operating system software and the software for the operation of the computer system.

The host bus 162 is coupled to an expansion or input/output bus 170 by means of a bus controller 168 or bus bridge logic. The expansion bus 170 is preferably the PCI (Peripheral Component Interconnect) expansion bus, although other bus types may be used. The expansion bus 170 may include slots for various devices such as the instrumentation card 114, a GPIB (General Purpose Interface Bus) card, etc. The computer 102 may also include a display subsystem 180 and a disk drive 182 that are coupled to the expansion bus 170.

An instrumentation card 114 may be coupled to the computer system by the expansion bus 170. In some embodiments, the instrumentation card may include a base card 116 and one or more daughter cards 118.

The base card 116 may be configured to accept various different daughter cards (each of which is referred to as a daughter card 118). In some embodiments, the base card 116 may include one or more programmable logic devices (PLDs) 120A and/or 120B, such as FPGAs (Field Programmable Gate Arrays), PALs (Programmable Array Logic), PLAs (Programmable Array Logic), EPLDs (Erasable PLDs), PEELs (Programmable Electrically Erasable Logic), GALs (Generic Array Logic), etc.

In one embodiment, the base card 116 may be configured to perform generic functions that are common to many types of virtual instrumentation. For example, the base card may be configured to perform functions that may be used by oscilloscopes, multimeters, arbitrary waveform generators (AWGs), digitizers, etc. These functions may include both input and output functions. For example, the base card 116 may be configured to output waveforms to stimulate a UUT or process under test and/or to receive waveforms produced by the TUT in response to stimuli. Thus, the base card 116 may be designed so that it may be included in several different instrumentation card configurations, which may reduce instrumentation system costs and/or time to market through design reuse and/or the increased use of common components. Each different instrumentation card configuration may be defined (at least in part) by which daughter card(s) 118 are currently coupled to the base card.

The one or more daughter cards 118 that may be coupled to the base card 116 may be selected from a set of possible daughter cards. Each of the different possible daughter cards 118 may have a different daughter card configuration. Each daughter card configuration may be configured to adapt the functionality of the base card 116 to perform the function of a specific device (e.g., an oscilloscope, a multimeter, or an arbitrary waveform generator) or a combination of specific devices. Thus, the different daughter card configurations may be thought of as providing different "personalities" for the instrumentation card 114. By using appropriate daughter card configurations to customize the generic functionality of the instrumentation card 114, many different instrumentation systems may be derived from the same base card 116.

If the base card 116 includes any PLDs 120A or 120B (collectively referred to as PLD 120), different personalities may also be provided by reconfiguring one or more of the PLDs 120. Thus, even if the same daughter card(s) 118 are attached to the base board 116, the functionality of the instrumentation card 114 may be changed by changing which functions a certain PLD 120 (or set of PLDs 120) performs. The host system may reprogram a PLD 120 by supplying a new hardware description for that PLD 120.

Alternatively, even if the base board 116 does not include any PLDs 120, the host system may reconfigure the functions performed by the instrumentation card 114 by supplying a new set of instructions for the base card's processor to execute. If the base card does include a PLD 120, the host system may modify the instrumentation card's functionality by providing both a new hardware description for the PLD 120 and a new set of instructions for the PLD 120 to execute.

Figure 4:
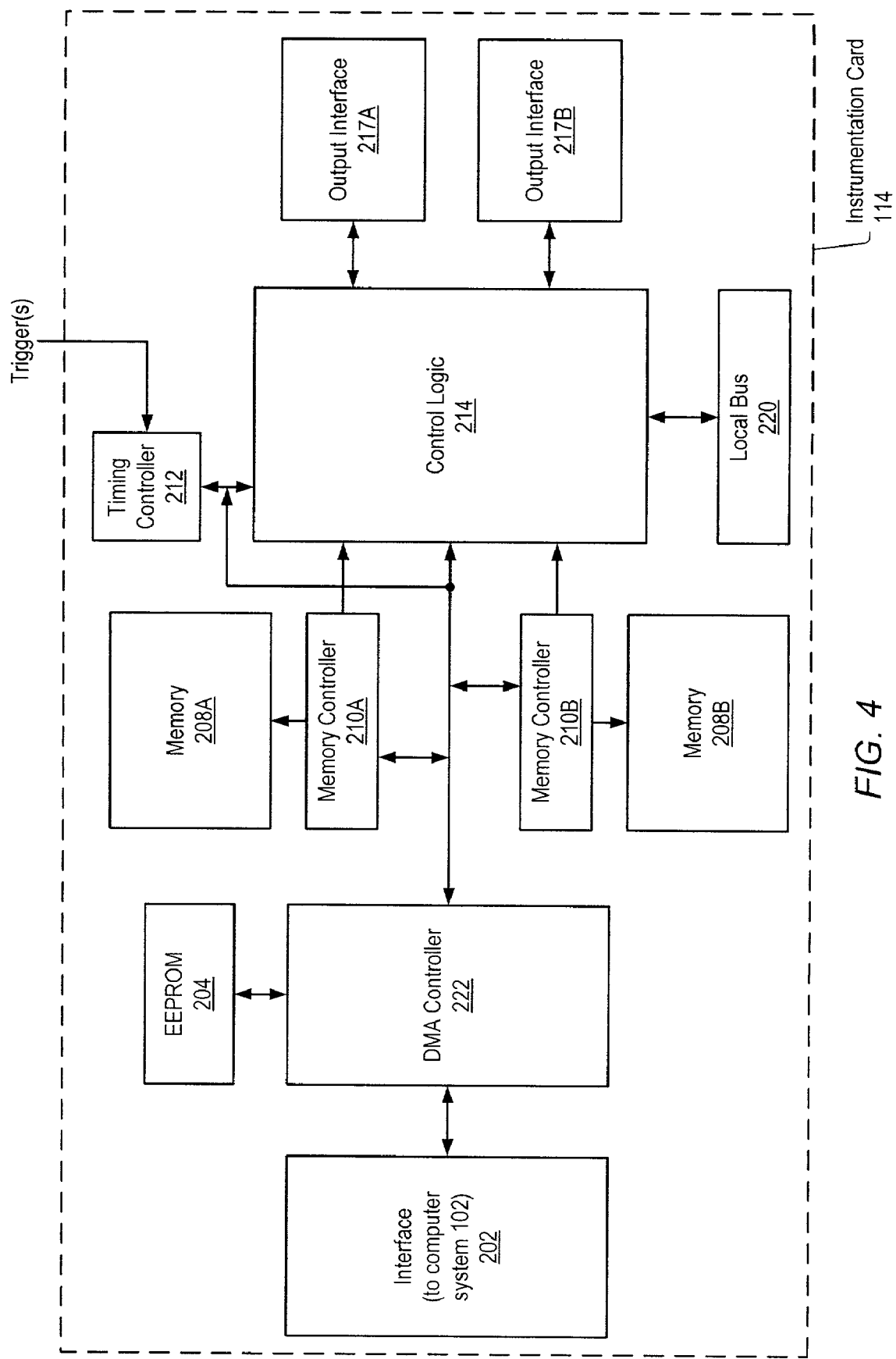
FIG. 4 is a block diagram of one embodiment of an instrumentation card.

FIG. 4—Instrumentation Card

FIG. 4 shows one embodiment of an instrumentation card 114. The instrumentation card 114 may include a functional unit or control logic 214. As mentioned earlier, this control logic 214 may be implemented in one or more PLDs and/or in one or more processors in some embodiments. For example, the control logic 214 may include an FPGA that may be configured to generate waveforms in response to instructions stored in the memories 208A and 208B (collectively referred to as memory 208). Note that the control logic 214 may also (or alternatively) be configured to perform other functions, such as those related to receiving and processing data output by a UUT. Also, while it is contemplated that one or more PLDs may be included on the instrumentation card 114, it is noted that in alternative embodiments, the control logic 214 may not be reprogrammable.

In addition to the control logic 214, the instrumentation card 114 may include an interface 202 to a host computer system. Instructions and data may be retrieved from the host computer system by a DMA controller 222 and stored in memory 208 by communicating with one or more memory controllers 210A and/or 210B (collectively referred to as memory controller 210).

Once data and instructions for a particular operation have been stored in memory 208, the control logic 214 may communicate with the memory controller 210 to request data and instructions from the memory 208.

In embodiments where the control logic 214 is implemented in a reconfigurable device, an EEPROM 204 (or any other memory device that holds its contents without power) may store configuration information that a host computer system may access when configuring the control logic 214. For example, if the control logic 214 is implemented in a PLD, the host computer system may use configuration information stored in the EEPROM 204 to reprogram the control logic 214 each time the system is powered on.

A timing controller 212 may provide time stamping capability and/or receive external trigger signals from other devices in the instrumentation system. The timing controller 212 may be configured to process and/or route received trigger signals to other sections of the instrumentation card 114. The trigger signals may allow execution of instructions by the control logic 214 to be conditioned on whether certain external events occur. Triggers may be received from other instrumentation devices in the instrumentation system. For example, if the instrumentation card 114 is coupled to a PXI backplane, triggers from other instrumentation cards may be received via a PXI trigger line. If the instrumentation card 114 is generating a waveform that is provided as stimulus to a UUT, the UUT may produce certain responses to the stimulus. These responses may be received by another instrumentation card or device in the instrumentation system, and based on the responses, that other card or device may provide a trigger to the timing controller 212 via a trigger line. Triggers may also be received in response to software setting a trigger. For example, the software controlling a particular process may set a register to a certain value, causing a trigger to be generated and provided to the timing controller 212.

The control logic 214 may also be configured to generate trigger signals that indicate the control logic's progress to other devices, such as timing controller 212. Timing controller 212 may responsively provide one or more of these internal trigger signals to another instrumentation device (e.g., via a PXI backplane).

In some embodiments, the control logic 214 may be coupled to a local bus 220. For example, if the instrumentation card 114 is coupled to a PXI backplane, a local bus 220 may provide a private communication channel between devices attached to neighboring slots.

Data generated by the control logic 214 may be output to a another device via a output interface 217A and/or 217B (collectively referred to as output interface 217). In some embodiments, the output interface 217 may output data to one or more daughter cards 118. Each output interface may be configured to size data output by the control logic 214 to the particular data width of the device currently coupled to the output interface 217. Note that in some embodiments, the instrumentation card 114 may have different numbers of output interfaces 217.

Waveform Generation

In one embodiment, an instrumentation card 114 may be configured as an arbitrary waveform generator (AWG), e.g., to output digital representations of various waveforms. For example, an instrumentation card 114 may be configured to output a digital representation of a user-specified waveform directly to a digital UUT or to output the digital representation to a DAC, which may then output the corresponding analog waveform to a UUT.

A waveform may be represented by a series of waveform samples. Generally, a waveform sample may be a value that represents a data value, such as a voltage level. When a series of waveform samples is provided to a DAC, the values of successive waveform samples may be converted to an analog waveform. Samples may be collected together in various orders to represent different waveform shapes, and the frequency at which different samples are output may affect the frequency of the converted waveform. Groups of samples that relate to a desired portion of a waveform may be grouped together into waveform sections or segments.

FIGS. 9A–9F show several examples of different waveform sections or segments. Waveform segments may include portions of standard waveforms (e.g., sine, square, and triangle) and/or arbitrary, user-defined shapes. Each waveform segment may be made up of one or more samples (typically multiple samples) and may be generated by a host computer system and/or stored in memory on an instrumentation card. Different waveform segments may include varying numbers of samples. Additionally, some waveform segments may define only a portion of a cycle of a waveform while other segments may define one or more cycles of a waveform.

Figure 10:
FIG. 10 shows an example of several segments that have been looped to form a stage.

An instrumentation card 114 may be configured to support looping, linking, and branching of waveform segments. Looping is a process where the same waveform segment is repeated multiple times. For example, FIG. 10 shows how the waveform segment of FIG. 9C has been looped three times. Looping produces repeated sequences of waveform segments. These repeated sequences are referred to as stages.

Figure 11:
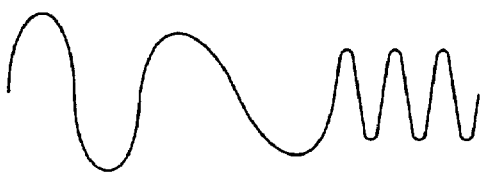
FIG. 11 shows an example of several segments that have been linked.

Linking is the process by which different waveform segments and/or stages are connected. FIG. 11 shows how the waveform segments of FIGS. 9A, 9E, and 9B have been linked to form a waveform.

Figure 12:
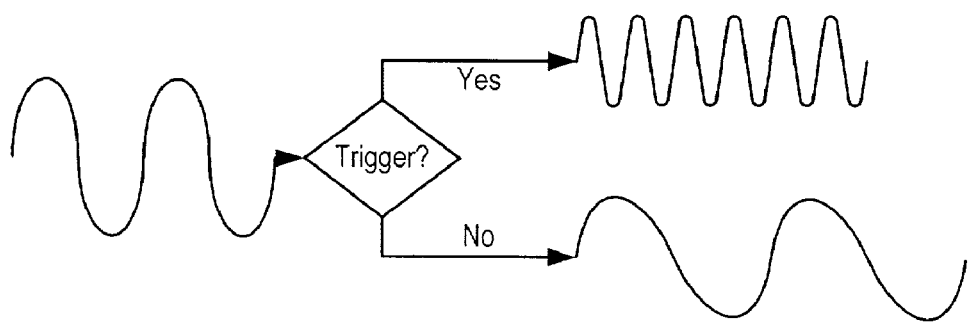
FIG. 12 illustrates an example of branching to create different waveforms based on a trigger condition.

Branching is a process in which a trigger event may determine which segments and/or stages are linked to form a waveform. For example, FIG. 12 shows how a stage that includes two repetitions of the segment from FIG. 9A may be linked to a stage of two looped segments from FIG. 9B or to a stage of two looped segments from FIG. 9E, depending on whether a trigger event occurs. As illustrated, if the trigger occurs, the initial waveform may be linked to the two looped segments from FIG. 9B. If the trigger does not occur, the initial waveform may be linked to the two looped segments from FIG. 9E.

FIG. 13 shows one embodiment of a method of generating a waveform based on trigger conditions. This method may be initiated by a providing a series of instructions from a host computer system to an instrumentation card 114. The series of instructions may be generated by compiling a user-created script that describes the desired waveform. Generally, as an instruction is received by the instrumentation card's control logic 214, one or more waveform segments identified in the instruction may be retrieved and stored in a particular waveform segment queue. If a conditional instruction (e.g., "if Trigger 1, output waveform segment A") is received, the waveform segments that correspond to the different possible outcomes of that instruction may be stored in different queues. Once waveform generation begins, waveform segments may be read from one of the queues. As triggers occur (or do not occur), different queues may be accessed, depending on which of the possible outcomes of corresponding conditional instructions actually occurs.

For example, at 1701, a first instruction to output a first waveform segment is received. This instruction may be an instruction to output the first waveform segment a certain number of times. In response to receiving the first instruction, the first waveform segment may be retrieved from a memory and stored in a first waveform segment queue, as indicated at 1703. If the first instruction specifies that the first waveform segment should be looped a certain number of times, several copies of the first waveform segment may be stored in the first queue. For example, if the first waveform segment should be looped three times, three copies of the first waveform segment may be successively stored in the first queue.

The memory that the first waveform segment is retrieved from may be configured to provide the data for the first waveform segment to the first waveform segment queue in bursts. If the data for the first waveform segment does not align with the burst boundaries, portions of the data burst(s) from the memory that do not contain data for the first waveform segment may be discarded so that only the data for the first waveform segment is stored in the first waveform segment queue.

At 1705, a second instruction to output a second waveform segment if a trigger occurs is received. In response to receiving this second instruction, the second waveform segment may be retrieved from the memory and stored in a second waveform segment queue, as shown in 1707.

In addition to waveform segments, trigger condition information may be stored in a waveform segment queue. For example, as the second waveform segment is stored in the second waveform segment queue, data indicating that the second queue should be selected if the trigger occurs may also be stored in the second waveform segment queue. Similarly, data indicating that the first waveform segment queue should be deselected if the trigger occurs may be stored in the first waveform segment queue.

Figure 14:
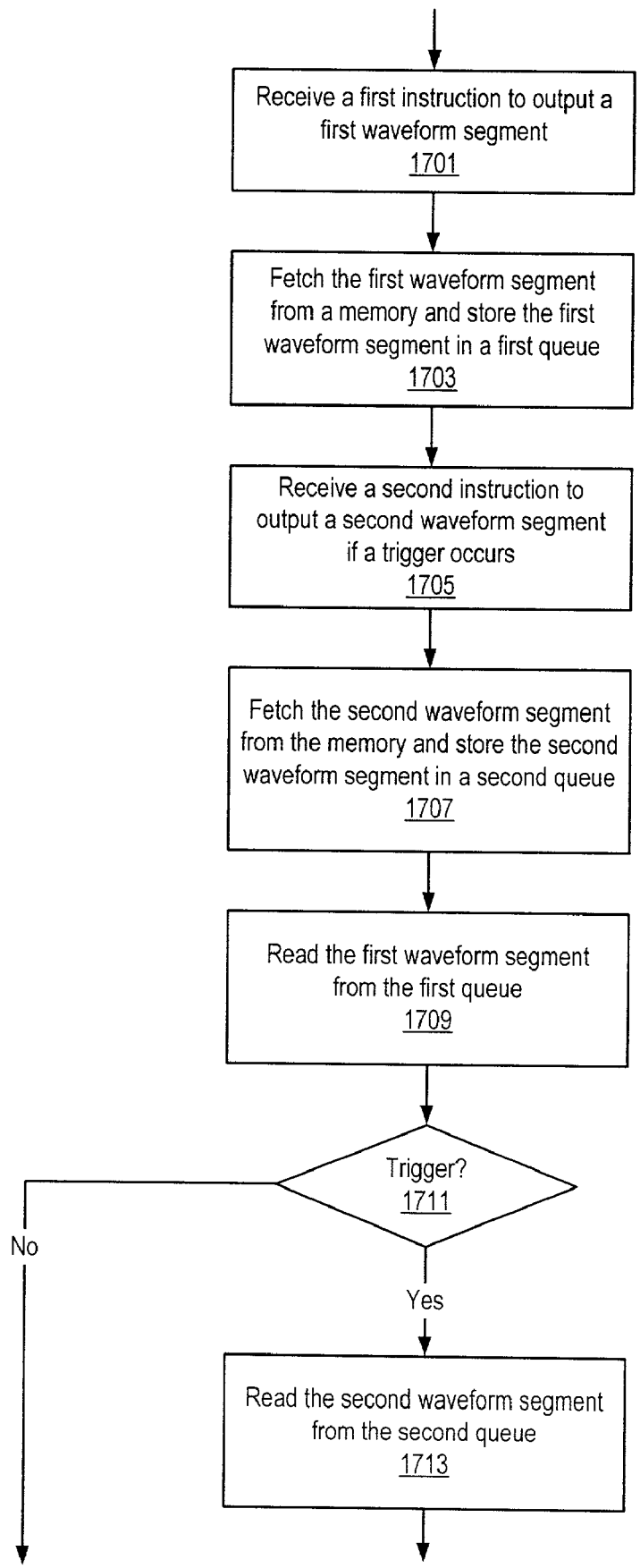
FIG. 14 is a flow chart illustrating one embodiment of a method of generating a waveform.

Although not shown in FIG. 14, other instructions may also be received at various times. In response to some of these other instructions, other waveform segments may be retrieved from the memory and stored into various waveform segment queues, including the first and second waveform segment queues.

As part of waveform generation, the first waveform segment is read out of the first waveform segment queue, as shown at 1709. At 1711–1713, if the first trigger occurs, the second waveform segment may be read out of the second queue. Thus, various trigger conditions may determine which queue is being read from at any particular time. These trigger conditions may be identified by data at the head of one or more of the waveform segment queues. Thus, during a first time period, one or more waveform segments, including the first waveform segment retrieved in step 1703, maybe read from the first waveform segment queue. However, at the end of the first time period, a first trigger may occur. The remaining unread data in the first waveform segment queue may describe a waveform that would have been output if the first trigger had not occurred. In contrast, the data in the second waveform segment queue, including the second waveform segment, may describe the waveform that should now be output in response to the first trigger occurring. In response to the first trigger occurring, one or more waveform segments, including the second waveform segment, may be read out of the second waveform segment queue. In some embodiments, waveform segments may be read out of the first or the second waveform segment queue while other waveform segments are being retrieved and stored into waveform segment queues.

FIGS. 5–8—Instrumentation Card Output System

Figure 5:
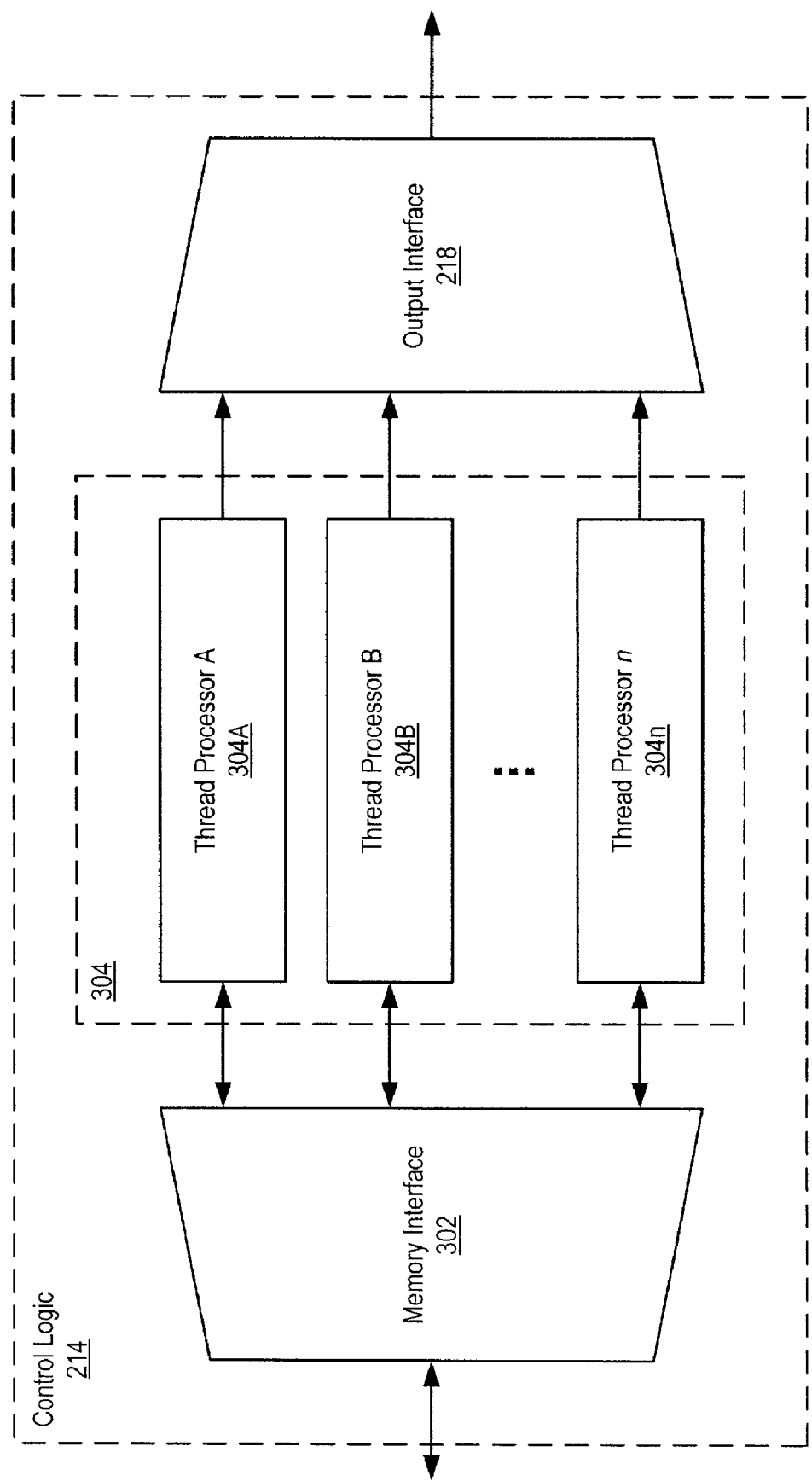
FIG. 5 shows one embodiment of control logic that may be included in an instrumentation card.

FIG. 5 illustrates one embodiment of control logic 214 that may be included in the instrumentation card 114 described above. The control logic 214 may include several waveform segment queues. Using these queues, the control logic 214 may generate one or more waveforms using linking, looping, and/or branching in response to instructions from a host computer system.

The control logic 214 may include a memory interface 302 that is configured to interact with a memory controller in order to retrieve data and/or instructions from a memory device (e.g., memory 208 in FIG. 4) on the instrumentation card 114. These instructions and/or data may have been stored to the instrumentation card's memory 208 by a host computer system. The instructions may have been generated by compiling a script that was created on the host system by a user. This script may defined the waveform and the compiling process may translate the script into instructions executable by the instrumentation card's control logic 214.

The DMA controller 222 shown in FIG. 4 may begin reading the instructions and waveform segments from the host computer system in response to an indication that the host system has compiled the script and defined the waveform segments for a particular output waveform. The DMA controller 222 may write the data and instructions into the appropriate places in the base card's memory 208 so that the control logic 214 may retrieve them. The host system may send an indication to the control logic 214 indicating that the control logic should begin fetching the instructions and waveform samples from the instrumentation card's memory 208 after a certain portion of the instructions and data has been copied to the instrumentation card's memory 208 by the DMA controller 222.

The control logic 214 may also include an instruction and data processor 304. The instruction and data processor 304 may be configured to retrieve the stored instructions from the memory 208 through the memory interface 302 and to decode and execute the retrieved instructions. In the illustrated embodiment, the instruction and data processor 304 is implemented as n parallel thread processors A-n. Each thread processor may execute a thread in a particular data stream. One embodiment of an individual thread processor 304A is described in more detail in FIG. 6.

An output interface 218 may receive data from one or more of the thread processors A-n and output data to another device (e.g., to a daughter card 118, to a signal conditioning system, to an interface to a DAC, or to an interface to a digital UUT via the output interface 217 shown in FIG. 4). For example, each thread processor may output data to the output interface 218, and the output interface 218 may select one of the thread processors' outputs and provide the selected output to the output device. Note that a different interface, such as an interface to, may be included in addition to or instead of the daughter card interface 218, since the instrumentation card 114 may not include a daughter card 118 in some embodiments.

If additional output streams are desired, additional output interfaces 218 may be included, or the existing interface 218 may be configured to output data to several different devices.

In one such embodiment, some of the thread processors may output data to all of the interfaces (e.g., the same data stream may be provided to all of the interfaces). In another embodiment, different groups of thread processors may provide data to each of the interfaces (e.g., a different data stream may be provided to each of the interfaces).

Figure 6:
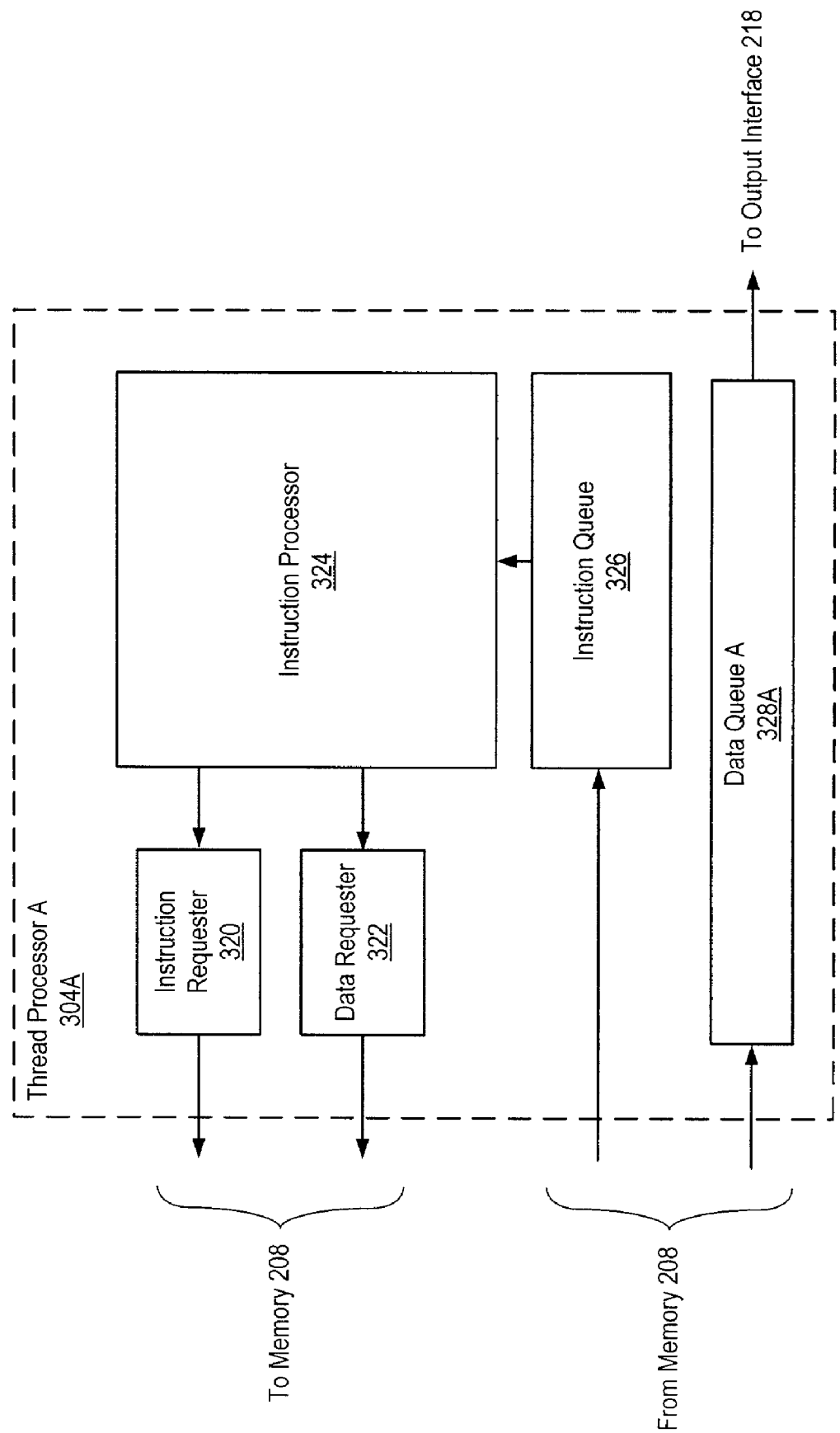
FIG. 6 illustrates one embodiment of a thread processor that may be included in control logic like that shown in FIG. 5.

FIG. 6 shows one embodiment of one of the thread processors 304A. Each thread processor may independently fetch instructions from the instrumentation card's memory 208 using an instruction requester 320. Each thread processor may thus fetch a different set of instructions (although the different sets may contain many common instructions). As the thread processor 304A decodes instructions, it may fetch any data specified in the instruction and store that data in a waveform segment queue 328A.

The instruction requester 320 may be configured to assert requests for instructions to the memory interface 302. The host computer system may initialize each thread processor's instruction requester 320 by providing the instruction requester 320 with the address of the first instruction to fetch in its thread. In one embodiment, each thread processor may have a unique identifier. The host system may use this identifier when sending the starting address of the instructions in a thread to identify which of the thread processors' instruction requesters should execute that thread.

An instruction requester 320 may be configured to continue to request instructions until its instruction queue 326 is full. Whenever space is freed in the instruction queue 326, the instruction requester 320 may request additional instructions. In one embodiment, the instruction requester 320 may continue to assert requests until a halt instruction is received.

As instructions are received from the memory 208, they may be placed within the requesting thread processor's instruction queue 326. The instruction processor 324 may retrieve the instructions from this queue 326, parse the instructions, and fetch data from the memories based on the parsed instructions. For example, if an instruction tells the instruction processor 324 to loop waveform segment A three times, the instruction processor 324 may indicate that the data requester 322 should assert three successive requests for waveform segment A. Note that each request for segment A may include multiple requests for data from memory 208, depending on the size of segment A and the amount of data provided in response to each request. For example, the instruction may identify the beginning and ending address at which waveform segment A is stored, and based on these addresses, the data requester 322 may be configured to continue to assert data requests until all of waveform segment A has been retrieved from the memory 208.

As the requested data is received, it may be stored in the thread processor's waveform segment queue 328A. The waveform segment queue 328A may also store additional information, generated by the instruction processor 324 during its parsing of the instructions, that identifies any trigger conditions that may be relevant when a particular unit of data (e.g., a waveform sample, segment, or stage) reaches the head of the waveform segment queue 328A. For example, this additional information may describe which threads should be activated and/or deactivated if certain trigger conditions occur.

Typically, instructions may be written to and read from the instruction queue 326 using a pointer to the head of the instruction queue 326. In one embodiment, the instruction queue 326 may be configured to allow certain instructions to be executed certain numbers of times. For example, one instruction may identify how many instructions to repeat and how many times to repeat those instructions. Such an instruction may allow a set of instructions in the instruction queue 326 to be repeated several times without having to refetch the instructions each time they are repeated. The instruction queue 326 may have a temporary read pointer that may be used to cycle through the repeated instructions until they have been repeated the specified number of times. While the temporary read pointer is being used, the pointer to the head of the instruction queue may be frozen so that the instruction queue 326 does not appear to be freeing up room for additional instructions. This way, the instruction set that is to be repeated may not be overwritten in the queue 326 until the instructions have been repeated the desired number of times.

Once the instruction requester 320 is initialized and begins requesting instructions, the host system that controls the instrumentation card 114 may be configured to wait until the instruction requester 320 and/or the data requester 322 have requested enough instructions to fill a certain portion of their respective queues 326 and 328A before enabling actual waveform generation. For example, in one embodiment, the control logic 214 may assert an interrupt or set (or clear) a certain bit when the instruction and/or waveform segment queues for each thread processor (that is currently executing a thread) has been filled, or "primed," with a certain amount of data. In response to the indication that the instruction and/or waveform segment queues have each been primed, the host system may enable waveform generation. Waveform generation may be enabled by writing a certain value to a control register in the instrumentation card 114.

Note that while FIG. 5 shows the instruction/data processor 304 as n parallel thread processors, in some embodiments, the processor 304 may include n waveform segment queues but fewer than n instruction processors, instruction queues, instruction requesters, and data requesters. For example, a single processor may fetch and decode instructions for multiple threads and store data for each thread in an independent waveform segment queue.

Also note that since the thread processors may be prefetching (e.g., the host system may wait until a certain volume of instructions and/or data has been fetched before initiating waveform generation), the instrumentation card's memory may be either DRAM or SRAM. Typically, DRAM is a slower, more-dense, and less expensive type of memory than SRAM, so embodiments that include DRAM may offer cost and space savings over embodiments that include more SRAM. Alternatively, DRAM embodiments may offer a larger memory on the instrumentation card 114.

Figure 7:
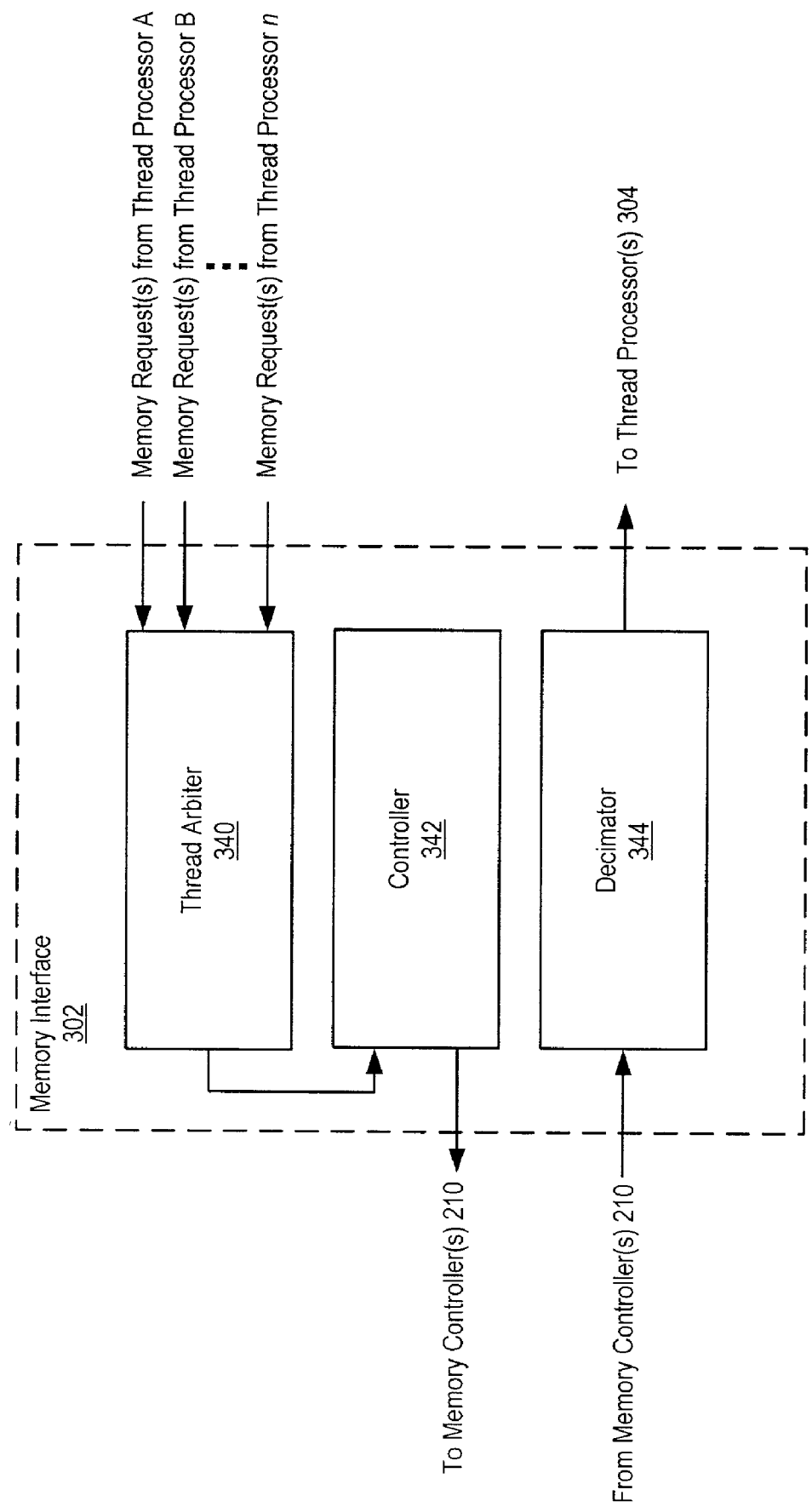
FIG. 7 shows one embodiment of a memory interface that may be included in control logic like that shown in FIG. 5.

FIG. 7 illustrates one embodiment of the memory interface 302 that may be included in the control logic 324. In some embodiments, the instrumentation card 114 may include a separate memory and memory controller for each thread processor and provide an independent data pathway between each thread processor and its associated memory system. In other embodiments, however, each memory controller and memory may be shared between two or more thread processors. In these embodiments, a thread arbiter 340 may arbitrate between the various thread processors' requests for instructions and data from one or more of the memories. The thread arbiter 340 may forward a selected one (or more) of the requests to a controller 342, which may then assert the selected request(s) to the appropriate memory controller(s).

In some embodiments, the memory (or memories) may return bursts of data in response to each request. As a result, the beginning or end of a requested instruction or waveform segment may not be aligned to the same size boundary as the bursts are aligned to. If so, instructions and/or data from the memories may be passed through a decimator 344 in order to discard unneeded words or bytes before the instructions and data are sent to the requesting processor's instruction or waveform segment queue.

Figure 8:
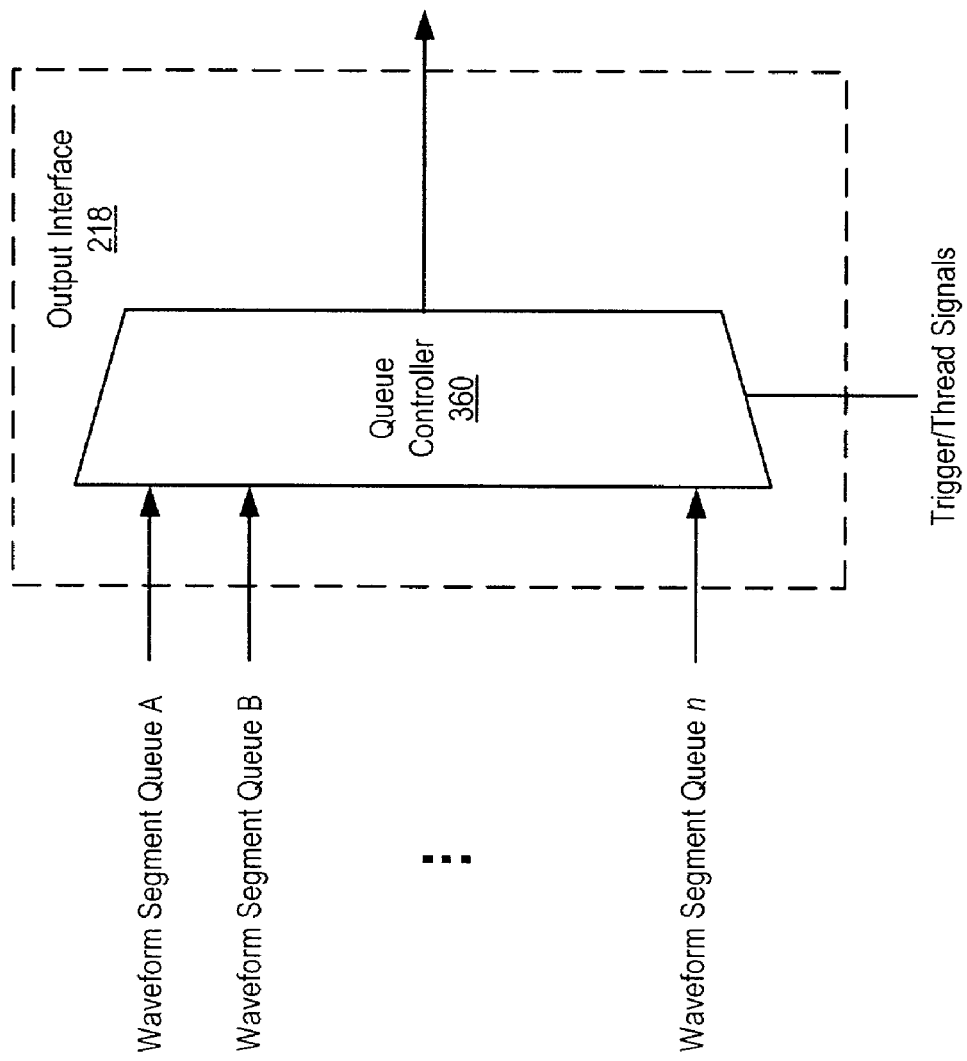
FIG. 8 is a block diagram of one embodiment of an output interface that may be included in control logic like that shown in FIG. 5.
Figure 9A:
FIGS. 9A–9F each show an example of a waveform segment or section.
Figure 9B:
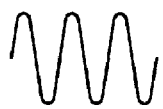
Figure 9C:
Figure 9D:
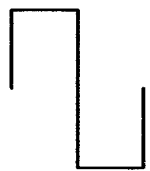
Figure 9E:
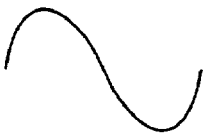
Figure 9F:

In FIG. 8, one embodiment of the output interface 218 is shown. The output interface 218 may include a queue controller 360 that is configured to receive data from each of the waveform segment queues A-n and to select one (or more) of the waveform segment queues based on a trigger and/or thread select input. The value or level of the trigger/thread select input that will cause one thread's waveform segment queue to be selected (or deselected) may be calculated by that thread's instruction processor 324 and stored with a particular waveform segment or sample in the waveform segment queue. As waveform segment queues are selected and deselected, their corresponding threads are activated and deactivated.

The triggers that control which thread is activated or deactivated may depend on several independent trigger signals. For example, one trigger may depend on several triggers received from external devices (e.g., other cards in a PXI system). The queue controller 360 (or alternatively, an internal timing controller 212 like the one shown in FIG. 4) may be configured to combine sets of triggers to generate the appropriate thread triggers. Information that describes how each thread trigger should be generated may be contained in one or more registers that may be initialized by the host system when it initiates waveform generation.

Once one of the waveform segment queues has been selected, the queue controller 360 may read data out of the selected waveform segment queue. In one embodiment, the queue controller 360 may be configured to begin reading out of a certain queue (e.g., waveform segment queue A) each time waveform generation is initiated. Depending on which trigger conditions occur, the queue controller 360 may be configured to activate other threads and deactivate the initial thread. In alternative embodiments, the queue controller 360 may instead evaluate trigger or thread conditions when waveform generation is initiated and select one of the waveform segment queues to initially begin shifting samples out of based on those initial conditions.

The queue controller 360 may dynamically switch which waveform segment queue is currently being read from based on the trigger information associated with the data at the head of each waveform segment queue and the trigger conditions received. For example, a first waveform segment queue may contain waveform segments that should be output if a certain trigger condition does not occur. A second waveform segment queue may store the data that should be output if the trigger condition does occur. Before the trigger, the first waveform segment queue may be the selected waveform segment queue. In response to the trigger occurring, the queue controller 360 may stop reading data from the first queue and begin reading data from the second queue. The queue controller 360 may be configured to make this switch without producing any gaps in the data that is provided to the output interface 218. Note that in some embodiments, data may be removed (but not provided as an output) from one or more of the non-selected queues at the same time as data is being read out of the selected queue and provided as an output to a recipient card or device. Additionally, in some embodiments, the output stream may be passed through a delay unit (e.g., for multi-board synchronization) before being provided to a recipient card or device.

In some embodiments, the queue controller 360 may be configured to switch between threads at certain times. For example, the queue controller 360 may be configured to wait until the final sample in the current segment has been shifted out of the active thread's waveform segment queue before deactivating that thread and switching to a new thread. In such an embodiment, the queue controller 360 may be configured to sense a trigger and, in response, record the trigger until the final sample in the segment has been shifted out.

In one embodiment, the queue controller 360 may be configured to switch between threads in response to certain trigger conditions based on trigger condition information associated with the active thread's queue (or trigger condition information included with the waveform segment currently at the head of the active thread's queue). For example, the data at the head of the selected queue may indicate that the selected queue should be deselected if a trigger occurs (or does not occur). The data may also identify which queue should be selected if the trigger does occur (or does not occur). However, the queue controller 360 may also be configured to activate another thread in response to a trigger condition identified in the other thread, even if the active thread does not identify the potential switch in its trigger condition information. This operation may be analogized to an interrupt service routine in a personal computer system. For example, this interrupt operation may be used to perform an emergency shutdown based on a certain trigger condition. In some embodiments, the queue controller 360 may be simplified by limiting the number of threads that can perform such an interrupt (e.g., only thread A may be able to interrupt an active thread).

In addition to switching between threads, the queue controller 360 may also use trigger conditions to perform other operations. For example, the queue controller 360 may be configured to "pause" an active thread in response to a certain trigger. Pausing may involve repeatedly shifting the sample at the head of the selected queue out until a trigger that signals the end of the paused state is received. In some embodiments, the times at which pauses may occur may be limited (e.g., pauses may only occur on the final sample in a segment).

In addition to receiving triggers, the queue controller 360 (and/or an internal timing controller 212) may be configured to generate one or more triggers based on thread conditions. These generated triggers may be provided to external devices. For example, one trigger may be asserted each time the first sample in a new segment is shifted out of the active thread's waveform segment queue. Another trigger may be asserted periodically (e.g., this trigger may be asserted each time a certain number of samples are shifted out of the active thread's waveform segment queue, regardless of segment boundaries).

Thus, as described above, control logic 214 like that shown in FIGS. 5–8 may be used to generate waveforms using waveform segment queues. For example, a simple waveform may be generated using a single thread processor by sending an instruction that specifies a certain waveform segment and a number of iterations (e.g., loop on waveform segment A six times). The waveform segment may be stored in one of the queues the specified number of times, and the output may be read out of that queue.

Figures 13A, 13B:
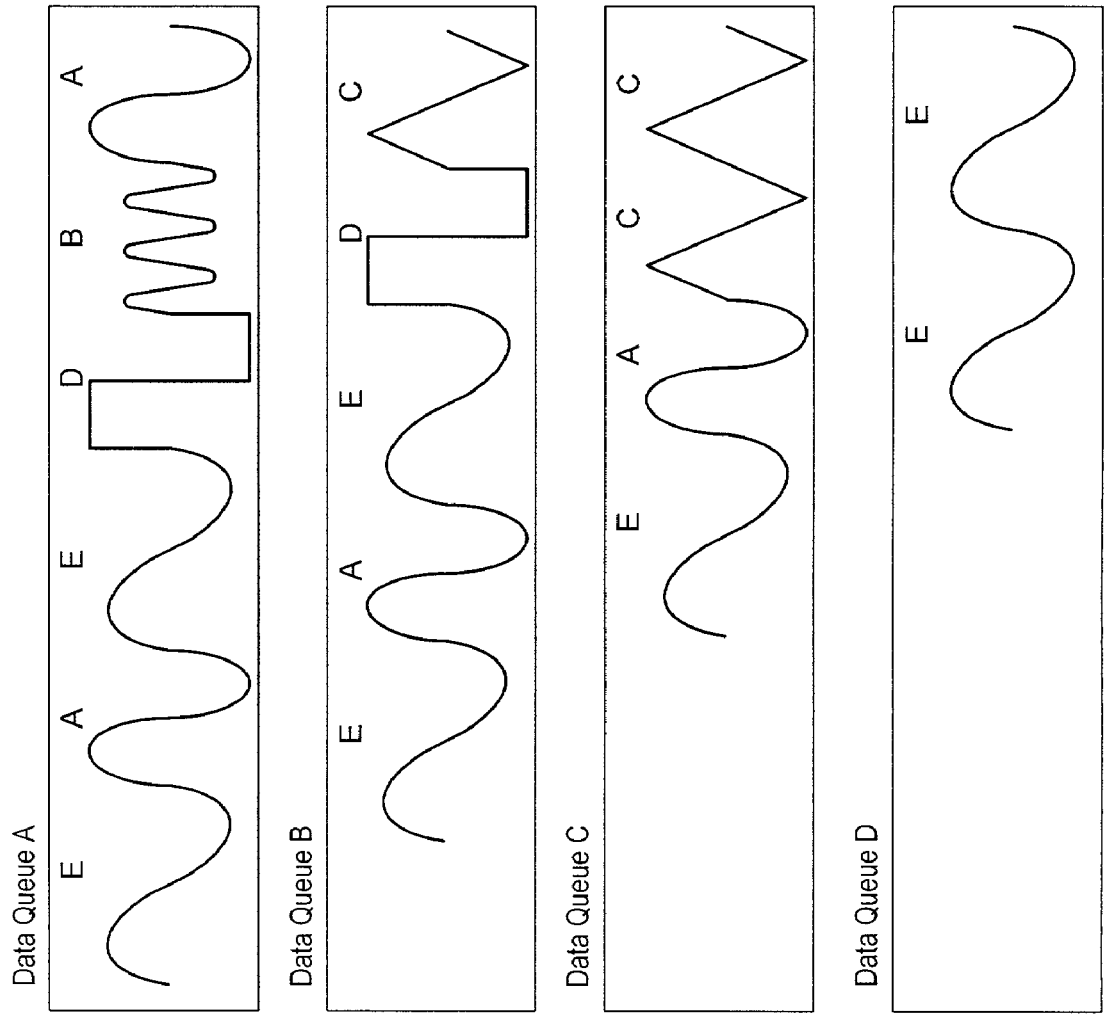
FIG. 13A provides a sample instruction sequence that may be used to generate a waveform by linking, looping, and branching.
FIG. 13B shows the waveform segments that may be stored in waveform segment queues when one embodiment of an instrumentation card is prefetching data in response to the instructions of FIG. 13A.

Waveforms that are more complex may also be generated. For example, FIG. 13A shows one example of a set of instructions that may be used control the output of an instrumentation card 114 like the one shown in FIGS. 4–8. The waveform segments A–E specified in the instruction sequence of FIG. 13A correspond to the waveform segments shown in FIGS. 9A–9E respectively. FIG. 13B shows an example of the various waveform segments that may be stored in some of the thread processors' waveform segment queues in response to the sample instructions of FIG. 13A.

The first instruction shown in FIG. 13A, "generate A," may be included in a first thread that is executed by thread processor A. Accordingly, waveform segment A may be fetched and stored at the head of waveform segment queue A, as shown in FIG. 16B. Similarly, segment B is stored behind segment A in response to instruction 2.

Instruction 3 is a conditional instruction to generate segment C if a first trigger occurs. Since there are two possible outcomes for this instruction, a new thread may be started so that the waveform segments for each outcome are stored in different waveform segment queues. In this example, the first thread, stored in waveform segment queue A, stores the waveform segments that should be output if the first trigger does not occur, and a new thread, stored in waveform segment queue B, stores the segments that should be output if the first trigger does occur. In addition to the waveform segments, waveform segment queue A may store information regarding the first trigger condition and indicating that thread A should be deactivated if the first trigger does not occur. Waveform segment queue B may store waveform segment C at the head of its queue, so that if the first trigger occurs, the queue controller may switch from reading samples out of waveform segment queue A to reading samples out of waveform segment queue B.

Instruction 4 may be included in both the first and the second thread since it is not conditioned on the first trigger. Thus, segment D may be stored in both waveform segment queues A and B. Similarly, in response to instruction 5, segment E may be stored in both waveform segment queues A and B. This way, regardless of which waveform segment queue A or B is selected at this point in the waveform (and thus regardless of whether the first trigger occurred), segments D and E may be included in the output waveform that is read out by the queue controller 360.

Instruction 6 is another conditional instruction. Here, segment C should be looped twice if a second trigger occurs. Since instruction 6 is conditional, another thread may be initiated at instruction 6. Samples for this third thread may be stored in waveform segment queue C. Thus, two successive copies of the segment C may be stored at the head of waveform segment queue C. Additionally, the first and second threads may store information in waveform segment queues A and B respectively identifying that, if the corresponding thread is the active thread when the second trigger occurs, the corresponding thread should be deactivated. Thus, if the second trigger occurs, the queue controller may switch from reading samples out of waveform segment queue A or B to reading samples out of waveform segment queue C.

As with instructions 4 and 5, instruction 7 is not conditional. Thus, the first, second, and third threads may store waveform segment A in queues A, B, and C respectively.

Instruction 8 is a conditional instruction to generate E if a third trigger occurs. In response to this instruction, a new thread may be started to store the waveform that should be output if the third trigger occurs. Thus, the fourth thread may store segment E in waveform segment queue D. Each of the first, second, and third threads may store information identifying the trigger condition and that each thread should be deactivated if the third trigger occurs. Thus, if one of these threads is the active thread and the third trigger occurs, the queue controller may deactivate the active thread and switch to the fourth thread.

Instruction 9 indicates that segment E should be generated. Since this instruction is not conditional, each thread's waveform segment queue may store segment E. Instruction 10, a halt instruction, may cause each thread processor to cease fetching instructions and data.

If none of the first, second, and third triggers occur, the queue controller may read the entire waveform out of waveform segment queue A. If only the third trigger occurs, the queue controller may read the first five segments of the waveform from queue A and then read the next two segments of the waveform from waveform segment queue D. If all three triggers occur, the queue controller may read the first two segments (A and B) from waveform segment queue A, the next three segments (C, D, and E) from queue B, the next three segments (C, C, and A) from queue C, and the next two segments (E and E) from queue D.

Thus, this example shows how different threads may be initiated for each possible branch in the instruction sequence. By initiating a new thread for each possible branch and storing each thread's waveform data in an independent waveform segment queue, data may be prefetched for each potential branch. As a result, the data for any particular branch may be ready to be output in response to a trigger condition occurring (or not occurring). This way, an output waveform may be generated on the fly based on trigger conditions by switching between which waveform segment queue is being read from. If data is not available for each potential branch in the instruction sequence (e.g., a different waveform segment queue is not storing each potential branch's waveform samples), the output waveform may contain gaps (e.g., if a branch is taken and the waveform samples for that branch have not yet been fetched into one of the waveform segment queues).

In some embodiments, after certain threads are deactivated, the host system may destroy the deactivated threads and initiate new threads in the thread processors that were executing the destroyed threads. For example, in certain embodiments, if a first thread executing in thread processor A is deactivated in response to a trigger condition occurring (or not occurring), there may be very little, if any, chance that the first thread will become the active thread again. At the same time, there may be more potential branches in the instruction sequence than there are available thread processors. In order to start a new thread, the first thread may be destroyed by flushing the data in queue A and providing thread processor A with a new starting address for a new thread (as well as an indication to begin fetching instructions for that thread, if such an indication is used to initiate instruction fetching). The host system may destroy a thread by inserting a destroy instruction into that thread's instruction stream. For example, if an "if-then-else" type of instruction is desired, the first instruction of each branch may include an instruction to destroy the thread that includes the branch not taken. If a new thread's starting address is sent to a thread processor that is currently processing an existing thread, the thread processor may be configured to save the new starting address until the existing thread is destroyed.

As mentioned briefly above, the system shown in FIGS. 4–8 may be configurable to have different numbers of thread processors and/or waveform segment queues per output stream (e.g., per different waveform being output to a daughter card 118 or other device). For example, in one embodiment, the system may be configured to have one thread processor and/or waveform segment queue per output stream, while in another embodiment there may be two or more thread processors and/or waveform segment queues per output stream.

Depending on the number of threads that are fetching information and the type and speed of memory providing the data to the waveform segment queues, situations may arise where a waveform segment queue may underflow if it is flushed (e.g., in response to the waveform segment queue's current thread being destroyed), reloaded (e.g., in response to a new thread being initiated), and then selected by the queue controller again (e.g., in response to the new thread becoming the active thread) before the waveform segment queue has been primed with data for the new thread. The maximum latency of each memory request may depend, in part, on the number of threads currently asserting requests for data and/or instructions and any turnaround or overhead latencies that arise between requests. Since a thread processor may begin asserting new requests for data each time it is enabled for a new thread, limiting the number of threads that are fetching data at a given time based on bandwidth limitations associated with the memory system may decrease the probability that a waveform segment queue may underflow.

In one embodiment, the control logic 214 may be configured to operate in a waveform player mode. In this mode, the control logic 214 may execute an instruction sequence, including evaluating relevant trigger conditions, without sending the resulting data stream to another device (e.g., a daughter card 118). This way, the control logic 214 may evaluate whether any errors occur (e.g., if the active thread's queue underflows) during any portion of the data stream. If any errors are detected, the control logic 214 may provide an indication (e.g., by setting or clearing a status bit) to the host system, allowing the host system to modify the waveform. This way, an erroneous data stream may be detected before it is output to a DAC and/or a UUT.

While the waveform generation system is described above as being part of a generic instrumentation card 114 that includes both a base card 116 and one or more daughter cards 118, it is noted that other embodiments may have different configurations. For example, some embodiments of the waveform generation system may be implemented as a unified, non-reconfigurable instrumentation card.

Although the system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A system for generating waveforms, the system comprising:
a memory configured to store a plurality of waveform segments, wherein each waveform segment comprises one or more waveform samples, wherein in response to receiving a request for one of the waveform segments, the memory is configured to output the requested waveform segment;
a plurality of waveform segment queues each coupled to receive waveform segments output by the memory, wherein each waveform segment queue is configured to store a series of one or more waveform segments, wherein a first waveform segment queue is configurable to store a first series of one or more waveform segments, and wherein a second waveform segment queue is configurable to store a second series of one or more waveform segments;
a selection unit coupled to each of the waveform segment queues, wherein the selection unit is configured to read waveform segments out of a selected one of the waveform segment queues, wherein the selection unit is configured to access the first waveform segment queue during a first time period, and wherein the selection unit is configured to access the second waveform segment queue if a first trigger occurs.

2. The system of claim 1, further comprising a plurality of control units each coupled to request waveform segments from the memory and each configured to parse a series of instructions, wherein the plurality of control units comprises a first control unit, wherein in response to parsing a first instruction to output a first waveform segment, the first control unit is configured to request the first waveform segment from the memory.

3. The system of claim 2, wherein in response to parsing a second instruction to repeat a first set of one or more instructions in the series of instructions, the first control unit is configured to repeatedly parse the first set of instructions.

4. The system of claim 3, wherein the second instruction indicates a number of times the first control unit should repeatedly parse the first set of instructions and a number of instructions in the first set of instructions.

5. The system of claim 3, wherein the first control unit is configured to maintain a first instruction read pointer that indicates which instruction in the series of instructions the first control unit should parse next, wherein in response to parsing the second instruction, the first control unit is configured to use a temporary instruction read pointer to repeatedly parse the first set of instructions instead of using the first instruction read pointer to repeatedly parse the first set of instructions.

6. The system of claim 2, wherein the first waveform segment queue is configured to receive and store the first waveform segment from the memory.

7. The system of claim 2, wherein the first control unit is coupled to the first waveform segment queue and configured to store information in the first waveform segment queue, wherein the information instructs the selection unit to cease accessing the first waveform segment queue if the first trigger occurs.

8. The system of claim 2, wherein the plurality of control units comprises a second control unit, wherein in response to parsing a second instruction to output a second waveform segment if the first trigger occurs, the second control unit is configured to request the second waveform segment from the memory.

9. The system of claim 8, further comprising an arbiter coupled between the memory and the first and second control units, wherein the arbiter is configured to arbitrate between the first and the second control unit's requests for waveform segments and to forward a selected request to the memory.

10. The system of claim 8, wherein the second waveform segment queue is configured to receive and store the second waveform segment from the memory.

11. The system of claim 8, wherein in response to parsing a third instruction to output a third waveform segment regardless of whether the first trigger occurs, both the first and the second control units are configured to request the third waveform segment from the memory.

12. The system of claim 1, further comprising a plurality of control units each coupled to request waveform segments from the memory and each configured to parse a series of instructions, wherein the plurality of control units comprises a second control unit, wherein the second control unit is configured to store information in the second waveform segment queue, wherein the information instructs the selection unit to access the second waveform segment queue if the first trigger occurs, and wherein the selection unit is configured to access the second waveform segment queue if the first trigger occurs in response to the information stored in the second waveform segment queue.

13. The system of claim 1, wherein the selection unit is configured to switch from accessing the first waveform segment queue to accessing the second waveform segment queue if the first trigger occurs.

14. The system of claim 1, wherein the memory comprises DRAM memory.

15. The system of claim 1, wherein the memory is configured to output data in bursts.

16. The system of claim 15, further comprising a decimator coupled between the memory and the plurality of waveform segment queues, wherein the memory is configured to output each burst of data to the decimator and the decimator is configured to discard a portion of the data that does not correspond to the requested waveform segment and to pass a remainder of the data to one of the waveform segment queues.

17. The system of claim 1, further comprising a digital-to-analog converter, wherein the digital-to-analog converter is coupled to receive an output series of waveform segments that is read out of the selected waveform segment queue by the selection unit and to convert the output series of waveform segments into an analog waveform.

18. The system of claim 1, wherein the selection unit is further configured to pause an output being read out of the first waveform segment queue by repeatedly reading a same waveform sample out of the first waveform segment queue until an indication to end the pause is received.

19. The system of claim 18, wherein the selection unit is further configured to pause the output being read out of the first waveform segment queue in response to a second trigger.

20. The system of claim 19, wherein selection unit is configured to pause the output being read out of the first waveform segment queue in response to detecting information contained at the head of the first waveform segment queue, wherein the information identifies the second trigger and instructs the selection unit to pause the output if the second trigger occurs.

21. The system of claim 1, further comprising a controller, wherein the controller is configured to request waveform segments from the memory and to store requested waveform segments in a first portion of the waveform segment queues so that each of the first portion of the waveform segment queues stores waveform segments for a respective thread.

22. The system of claim 21, wherein each thread is configured to generate a waveform that should be output if a certain trigger occurs.

23. The system of claim 22, wherein in response to the selection unit ceasing to access one of the first portion of the waveform segment queues, the controller is configured to initiate a new thread by storing waveform segments for the new thread in the waveform segment queue that is no longer being accessed by the selection unit.

24. The system of claim 1, wherein the selection unit is configured to wait until a first indication is provided from a host computer system before beginning to read waveform segments out of the selected waveform segment queue.

25. The system of claim 24, further comprising a controller configured to provide a second indication to the host computer system in response to each of a first portion of the waveform segment queues storing a first amount of waveform samples.

26. The system of claim 25, wherein the first indication is provided from the host computer system in response to the second indication being provided to the host computer system.

27. A method of generating a waveform, comprising:
retrieving a first waveform segment from a memory;
storing the first waveform segment in a first queue;
retrieving a second waveform segment from the memory;
storing the second waveform segment in a second queue;
reading the first waveform segment from the first queue; and
if a first trigger occurs, reading the second waveform segment from the second queue;
wherein each waveform segment comprises one or more waveform samples.

28. A method of generating a waveform, comprising:
receiving a first instruction to output a first waveform segment;
in response to said receiving the first instruction, retrieving the first waveform segment from a memory and storing the first waveform segment in a first queue;
receiving a second instruction to output a second waveform segment if a first trigger occurs;
in response to said receiving the second instruction, retrieving the second waveform segment from the memory and storing the second waveform segment in a second queue;
reading the first waveform segment from the first queue; and
if the first trigger occurs, reading the second waveform segment from the second queue;
wherein each waveform segment comprises one or more waveform samples.

29. The method of claim 28, further comprising storing an indication in the first queue, wherein the indication indicates that no more waveform segments should be read from the first queue if the first trigger occurs.

30. The method of claim 28, further comprising providing an indication to initiate waveform generation, wherein said reading the first waveform segment occurs in response to said providing.

31. The method of claim 30, wherein said providing comprises providing the indication to initiate waveform generation in response to the first and the second queue each storing a first number of waveform samples.

32. The method of claim 28, further comprising providing the first waveform segment to a digital-to-analog converter.

33. The method of claim 32, further comprising providing an output of the digital-to-analog converter to a unit under test.

34. The method of claim 28, wherein said retrieving the first waveform segment from a memory comprises receiving one or more bursts of data from the memory.

35. The method of claim 34, wherein said retrieving the first waveform segment from the memory comprises discarding a portion of the data received in a first burst from the memory, wherein the discarded portion of the data does not define the first waveform segment.

36. The method of claim 28, further comprising:
receiving a third instruction to output a third waveform segment regardless of whether the first trigger occurs; and
in response to said receiving the third instruction, retrieving the third waveform segment from the memory and storing the third waveform segment in the first queue and in the second queue.

37. The method of claim 28, wherein the memory comprises DRAM memory.

38. The method of claim 28, further comprising pausing an output being read out of the first queue by repeatedly reading a same waveform sample out of the first queue until an indication to stop pausing the output is received.

39. The method of claim 38, wherein said pausing comprises pausing the output in response to a second trigger.

40. The method of claim 39, wherein said pausing comprises pausing the output in response to detecting information contained at the head of the first queue, wherein the information identifies the second trigger and that the output should be paused if the second trigger occurs.

41. The method of claim 28, wherein both the first and second queue store waveform segments for a respective thread.

42. The method of claim 41, wherein each thread defines a waveform that should be output if a certain trigger occurs.

43. The method of claim 42, further comprising initiating a new thread that defines a new waveform that should be output if a second trigger occurs and storing the waveform segments for the new waveform in the first queue in response to said reading the second waveform sample from the second queue.

44. A system configured to generate one or more waveform output streams, the system comprising:

a memory configured to store a plurality of waveform segments, wherein each waveform segment comprises one or more waveform samples;

a plurality of queues, wherein each queue is coupled to receive waveform segments from the memory, wherein each queue is configured to store a series of waveform segments for a respective one of the waveform output streams, wherein a first queue is configurable to store a first series of waveform segments, and wherein a second queue is configurable to store a second series of waveform segments;

a selection unit coupled to each of the queues, wherein the selection unit is configured to read waveform segments out of a selected one of the queues that stores waveform segments for a respective one of the waveform data streams, wherein the selection unit is configured to access the first queue during a first time period, and wherein the selection unit is configured to access the second queue if a first trigger occurs; and a control unit configured to store information in the first queue, wherein the information instructs the selection unit to cease accessing the first queue if the first trigger occurs.

* * * * *